Patented Oct. 30, 1951

2,573,644

UNITED STATES PATENT OFFICE 2,573,644

β-CHLOROETHYL AMINOINDANES

James F. Kerwin and Glenn E. Ullyot, Philadelphia, Pa., assignors to Smith, Kline & French Laboratories, Philadelphia, Pa., a corporation of Pennsylvania No Drawing. Application March 22, 1949, Serial No. 82,916

6 Claims. (Cl. 260—577)

This invention relates to new compositions of matter which have valuable physiological properties and, for example, variously possess adrenolytic or sympatholytic properties and antihistaminic properties.

The new compounds of the invention are hydrindene derivatives and may be represented by the general formula:

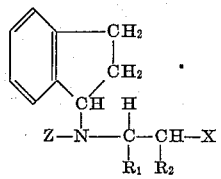

in which:

Z is a member of the group consisting of lower alkyl, lower alkenyl and benzyl groups.

$R_1$ and $R_2$ are members of the group consisting of hydrogen, methyl and ethyl.

X is a member of the group consisting of chlorine and bromine.

This invention also contemplates the salts of the compounds defined by the above general formula, formed with organic and inorganic acids, as, for example, hydrochloric, hydrobromic, sulfuric, phosphoric, sulfamic, oxalic, maleic, etc. More specifically, the inorganic and organic salts will be such as are prepared with inorganic and organic acids having an ionization constant not less than $1 \times 10^{-2}$ at 18° C.

The compounds according to this invention may be prepared by various procedure. However, they will be conveniently prepared by a two-step process in which α-chlorohydrindene is reacted with an N-monosubstituted amino alcohol and then the hydroxy group is replaced by chlorine or bromine. The first step may be carried out by several different methods, e. g., the reaction may be carried out in the presence or absence of an acid binding agent or with or without a solvent. The reaction is carried out conveniently by heating α-chlorohydrindene with two molar equivalents of the appropriate amino alcohol in an inert solvent, such as benzene, toluene, xylene, or the like. The hydrogen chloride, which results as a by-product of the reaction, forms an addition salt with the excess amino alcohol and separates from the solution. After filtration, the product can be isolated by removing the solvent or by forming a salt with an acid.

In the second step, the hydroxyl group of the intermediate alcohol is replaced by chlorine or bromine. Any of the usual reagents for effecting this conversion, such as thionyl chloride, thionyl bromide, concentrated hydrobromic acid, or the like, may be employed. The resulting β-haloethylamine is conveniently isolated and purified in the form of its hydrohalide salt. If desired, the free base can be obtained by adding one equivalent of strong alkali to a solution of the salt in the usual manner. Other inorganic and organic salts are formed by neutralizing the free base with the desired inorganic or organic acid.

The following examples will illustrate the various types of compounds contemplated by the invention as defined by the above general formula and procedure for their preparation.

EXAMPLE 1

N-(α-hydrindenyl)-N-ethyl-β-chloroethylamine hydrochloride

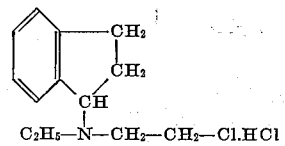

A solution of 25.8 g. of α-chlorohydrindene, 29.4 g. of ethylaminoethanol and 100 ml. of dry benzene is refluxed for one and one-half hours, cooled and filtered to remove ethylaminoethanol hydrochloride. The product, N-(α-hydrindenyl)-N-ethylaminoethanol, is obtained as the hydrochloride salt by passing dry hydrogen chloride into the filtrate. After several recrystallizations from alcohol and ether, the salt melts at 116–117° C.

A solution of 6.6 g. of N-(α-hydrindenyl)-N-ethylaminoethanol hydrochloride, 10 g. of thionyl chloride and 50 ml. of chloroform is refluxed for one-half hour. The solvent is evaporated and the residue recrystallized from alcohol-ether. N-(α-hydrindenyl)-N-ethyl-β-chlorethylamine hydrochloride melts at 143–144° C.

EXAMPLE 2

N-(α-hydrindenyl)-N-benzyl-β-chlorethylamine hydrochloride

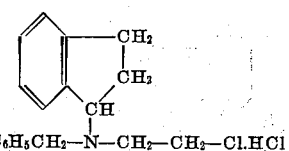

A solution of 23.5 g. of α-chlorohydrindene, 27.1 g. of benzylaminoethanol and 100 ml. of toluene is stirred and refluxed for two hours. Filtration removes benzylaminoethanol hydrochloride and addition of dry hydrogen chloride to the toluene solution forms N-(α-hydrindenyl)-N-benzylaminoethanol hydrochloride. After recrystallization of the salt from methanol and ether, it melts at 199–202° C.

A solution of 11 g. of thionyl chloride and 25 g. of chloroform is added to a cooled solution of 11 g. of N-(α-hydrindenyl)-N-benzylaminoethanol hydrochloride in 40 g. of chloroform. The solution is then warmed to 50–60° C. for an hour, the chloroform distilled off and the residue recrystallized from methanol and ether. N-(α-hydrindenyl) - N-benzyl-β-chloroethylamine hydrochloride melts at 184–185° C.

EXAMPLE 3

*N-(α-hydrindenyl)-N-methyl-β-chlorethylamine hydrochloride*

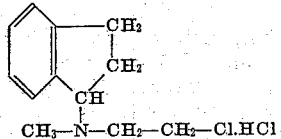

This compound will be prepared in the manner described for Example 1, except that methylaminoethanol will replace ethylaminoethanol in the first step.

EXAMPLE 4

*N-(α-hydrindenyl)-N-allyl-β-chlorethylamine hydrochloride*

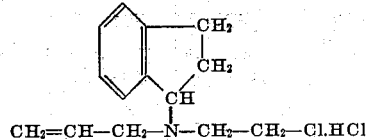

α-Chlorohydrindene and allylaminoethanol will be reacted in the manner indicated in Example 1. The resulting alcohol will then be reacted with thionyl chloride to form the compound shown above.

EXAMPLE 5

*N-(α-hydrindenyl)-N-ethyl-1-amino-2-chloropropane hydrochloride*

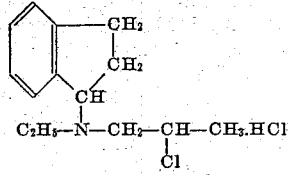

The procedure of Example 1 will be employed, using 1-ethylamino-2-propanol in place of ethylaminoethanol.

EXAMPLE 6

*N-(α-hydrindenyl)-N-isopropyl-2-amino-1-chlorobutane hydrochloride*

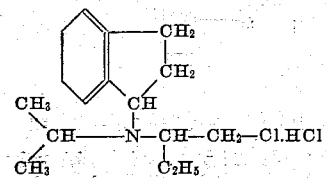

This compound will be prepared by reacting α-chlorohydrindene with 2-isopropylamino-1-butanol according to the method described under Example 1. The intermediate amino alcohol will be converted to the final product with thionyl chloride.

EXAMPLE 7

*N-(α-hydrindenyl)-N-benzyl-β-bromoethylamine hydrobromide*

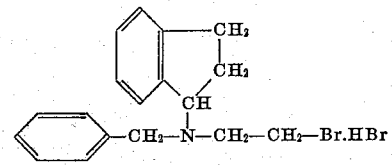

N - (α - hydrindenyl) - N - benzylaminoethanol, prepared as described under Example 2 will be converted into the hydrobromide salt and this salt will be reacted with thionyl bromide in chloroform solution to produce the β-bromoethylamine hydrobromide.

While, in the above examples, the products exemplified comprise hydrochloride or hydrobromide salts, the above several examples will serve as examples of the corresponding free bases, the structure of which will be specifically exemplified and made apparent by the erasure of HCl or HBr from the structural formulae given in the above several examples.

The preparation of the free bases corresponding to the hydrochloride or hydrobromide salts of the above several examples will involve merely the addition of one equivalent of a strong alkali, as, for example, sodium hydroxide, to a solution of the several salts in a manner usual and well known to chemists for the preparation of a free base from its hydrochloride salt and with the addition of such procedure the above several examples will serve as specific examples of the preparation of the several free bases.

The general formula for compounds in accordance with this invention will, taken with the above several specific examples, serve as specifically exemplifying all of the several compounds contemplated by this invention, it being merely necessary for specific exemplification of all of the several compounds contemplated and of their structure to substitute in the above general formula the several substituents given for Z, X, R$^1$ and R$^2$, all of which will be made perfectly apparent by reference to the general formula and the specific examples.

Again, the procedure given for the preparation of the several compounds contemplated and as exemplified by the general formula in the light of the specific procedure given in the above several examples, will be applicable to the preparation of each and every of the compounds according to the above general formula and contemplated by this invention, it being only necessary for the preparation of any particular compound to use the corresponding reagents, all of which are well known to, or readily prepared by, those skilled in the art.

The preparation of any given organic or inorganic salt of any of the compounds according to the above general formula requires only the neutralization of the free bases of the several compounds with the desired inorganic or organic acid, as is usual and well known to the chemist for the preparation of an organic or inorganic salt of a free base.

What we claim and desire to protect by Letters Patent is:

1. A compound of the class consisting of a free base and its organic and inorganic acid addition salts, said free base having the formula:

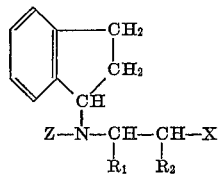

in which:

Z is a member of the group consisting of lower alkyl, lower alkenyl and benzyl;

$R_1$ and $R_2$ are members of the group consisting of hydrogen, methyl and ethyl; and X is a member of the group consisting of chlorine and bromine.

2. A compound having the structure:

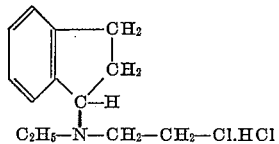

3. A compound having the structure:

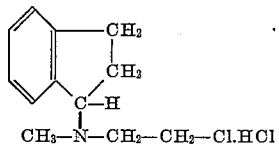

4. A compound having the structure:

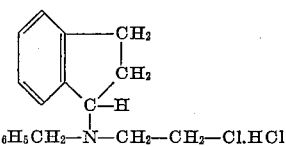

5. A compound having the structure:

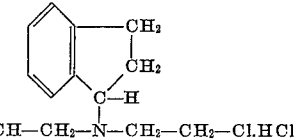

6. A compound having the structure:

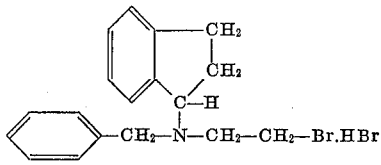

JAMES F. KERWIN.
GLENN E. ULLYOT.

REFERENCES CITED

The following references are of record in the file of this patent:

Courtot et al.: "An. Chim.," vol. 4, pp. 231–292 (1925).

Courtot et al.: "Bull. soc. chim.," vol. 39, pp. 452–469 (1926).

Levin et al.: "J. Org. Chem.," vol. 9, pp. 380–391 (1944).